July 7, 1925.                                                1,544,668
S. M. McCURDY
CONVERTIBLE STOCK FOUNTAIN AND FEEDER
Filed July 7, 1921          2 Sheets-Sheet 1

Inventor
Sanford M. McCurdy
By Lancaster and Allwine
Attorneys

July 7, 1925.
S. M. McCURDY
1,544,668
CONVERTIBLE STOCK FOUNTAIN AND FEEDER
Filed July 7, 1921     2 Sheets-Sheet 2
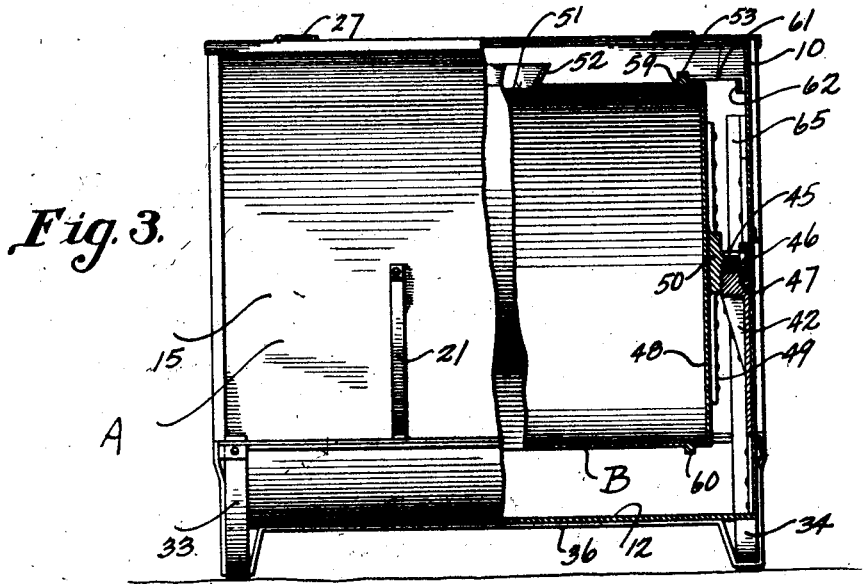
*Fig. 3.*
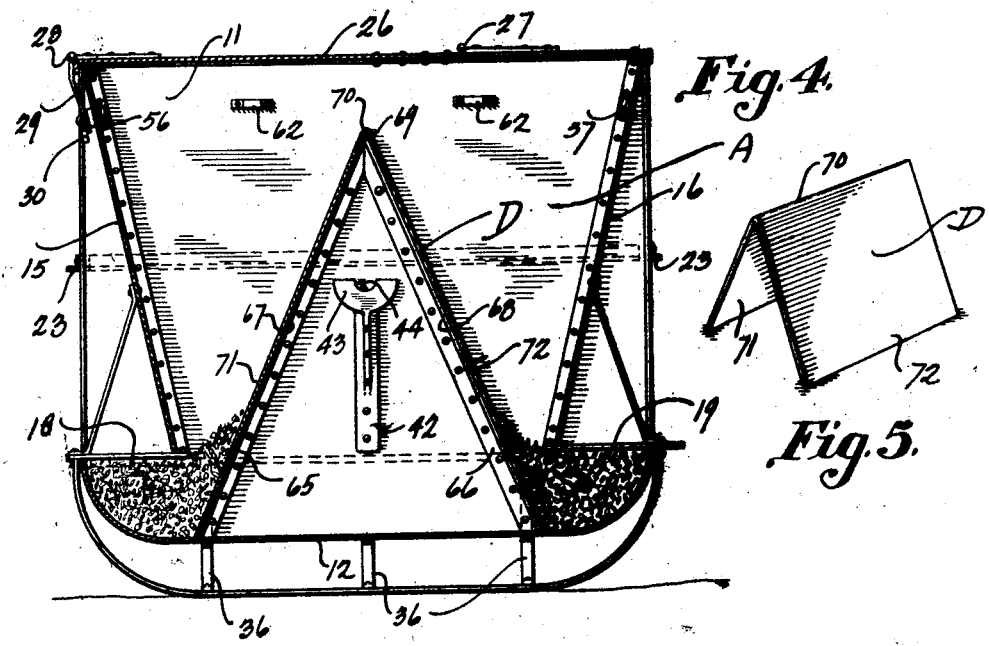
*Fig. 4.*
*Fig. 5.*
Inventor
Sanford M. McCurdy
By Lancaster Allwine
Attorney

Patented July 7, 1925.

1,544,668

UNITED STATES PATENT OFFICE.

SANFORD M. McCURDY, OF ADA, OHIO.

CONVERTIBLE STOCK FOUNTAIN AND FEEDER.

Application filed July 7, 1921. Serial No. 482,965.

*To all whom it may concern:*

Be it known that I, SANFORD M. MC-CURDY, a citizen of the United States, residing at Ada, in the county of Hardin and State of Ohio, have invented certain new and useful Improvements in Convertible Stock Fountains and Feeders, of which the following is a specification.

This invention relates to a convertible fountain and feeder of dry materials.

The primary object of the invention is the provision of a device of the above mentioned character which includes a casing and a revoluble container therein for regulating flow of liquid by automatic vacuum control.

A further object of the invention is the provision of a device of the above described character including a removable container adapted for detachment to be replaced by an inverted V-shaped guide for regulating the supply of dry material exteriorly of the casing for stock feeding purposes.

Other objects and advantages will be apparent during the course of the following detailed description.

In the accompanying drawings, forming a part of this specification, and in which similar reference characters designate corresponding parts throughout the several views, Figure 1 is a fragmentary plan view showing cooperating details of the improved device.

Figure 3 is a side elevation partly in section showing details associated with the device as a stock watering device.

Figure 4 is a vertical cross sectional view showing the improved device arranged for use as a feeder of dry materials.

Figure 5 is a perspective view of an element used in converting the fountain into a feeder of dry materials.

Figure 1:
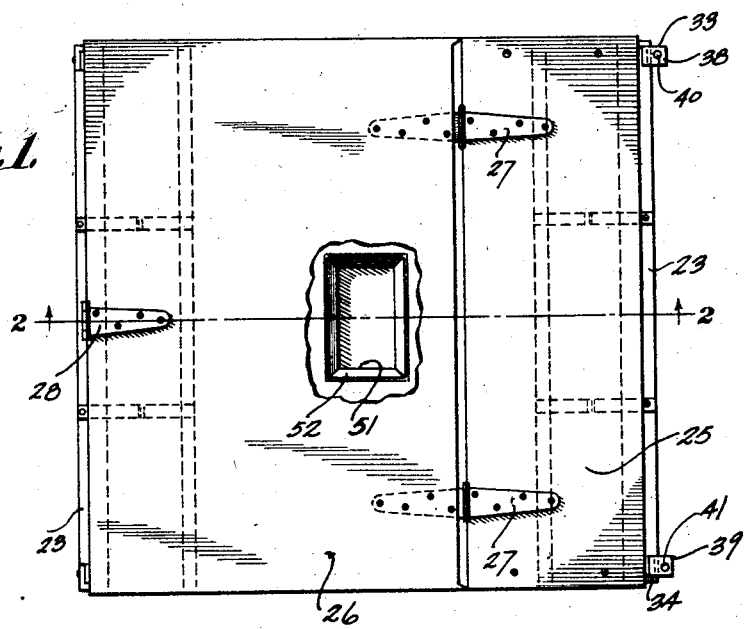

In the drawings, wherein for the purpose of illustration is shown the preferred embodiment of my invention, the letter A designates an outer casing having the revoluble container B mounted therein for the purpose of receiving liquid. Lock means C is provided, in connection with the use of the device as a stock fountain, for maintaining the container B in filling or discharge positions. A guide member D is provided, when the improved device is converted for a feeder of dry materials, to replace the container B.

The casing A, is preferably enclosed, and formed of sheet material. The same is preferably rectangular in formation, and provided with the relatively vertical end walls 10 and 11, disposed opposite each other. A bottom 12, is provided, having the arcuate side portions 13 and 14 upturned, for a short distance, to provide the extreme bottom of the casing A as a trough for the reception of liquids, such as water, milk and the like. The downwardly and inwardly converging side walls 15 and 16, are provided, opposite each other, and riveted by inturned flange portions 17 to the end walls 10 and 11. It is preferred that the side walls 15 and 16 have their lower ends terminating on a level with a plane defined by the extreme outer ends of the arcuated bottom 12, and spaced therefrom, to provide openings 18 and 19 below the side walls 15 and 16, respectively, leading directly into the trough structure formed in the casing A. Horizontal brace bars 20 are provided at suitable distances, connecting the extreme upper ends of the arcuate portions 13 and 14 in spaced relation to the extreme lower ends of the slanting side walls 15 and 16. To prevent buckling or distortion of the side walls 15 and 16, braces 21 have been provided at suitable distances for connection with the arcuate portions 13 and 14 and intermediate the upper and lower marginal edges of the side walls 15 and 16. Since in most instances, the sheet material of which the improved casing A is constructed, will buckle, due to the various sizes in which the same is manufactured, it is preferred that angle bars be provided as corner uprights in some instances. Likewise, horizontal reinforcing angles 23 are employed for maintaining the sides of the casing A in their proper shape. A small portion of the top 25 is provided rigid with the sides of the casing A. A closure member or cover 26 is hingedly connected at 27, upon the rigid top portion 25, said cover 26 being of sufficient width as to provide an opening for entrance and exit of the container B, and guide D. A hasp 28 is provided upon an edge of the closure 26 opposite the hinges 27 and adapted for having the swinging portion 29 thereof locked by the padlock 30 to a staple 31 on the inclined side wall 15 of the feeding casing A.

It will be desirable to mount the bottom 12 of the casing A off of the ground. To this end the sled runners 33 and 34 have been provided, depending below the bottom 12 and extending outwardly from the arcuate side portions 13 and 14 thereof for connection by strips 35 adjacent the entrances 18 and 19 of the casing A. Intermediate reinforcing bars 36 are appropriately bent to be attached to the end walls 10 and 11 for riveting or otherwise rigid connection to the runners 33 and 34, and for attachment beneath the bottom 12 of the casing, A as is clearly shown in Figure 3 of the drawings. The runners 33 and 34 are bent outwardly adjacent the feed opening 19 to provide projecting arms 38 and 39, having apertures 40 and 41 therein, for connection with any suitable means to transport the improved convertible fountain and feeder to any location.

Referring now to the use of the improved device as a liquid feeder or fountain, the brackets 42 are riveted or otherwise connected interiorly of the casing A and to the opposite end walls 10 and 11. The brackets 42 are each provided with a head 43 having a semi-circular depression 44 therein, for receiving the axially extending shafts 45 of the container B. The shafts 45 are each provided upon their extreme ends with an enlarged circular disc head 46 adapted for reception within a semi-circular groove 47 formed in the heads 43 concentric with the depression 44. The container B, is of course cylindrical in formation, the ends 48 of which are provided with the arms 49 riveted thereto; said arms radiating from a circular portion 50 formed axially in the outer surface of the ends 48 and from which body 50, the aforementioned shafts 45 project. The container B is so mounted in the brackets 42 as to be capable of complete revolution. An opening 51 is provided intermediate the ends 48 of the cylinder B and having an outwardly flaring mouth 52 formed adjacent said opening 51.

It will be necessary for the container B to assume only two positions in the operation of the improved fountain. One of these positions will be with the opening 51 upward, and adjacent the closure member 26 of the casing A; the other position being with the opening 51 diametrically opposed, that is downwardly. To this end, the container lock means C has been provided, the same preferably comprising a pair of bars 53 adapted to reach from the side wall 15 to the side wall 16, and having their ends downturned at 54 and 55, to form an acute angle with the run of the bars 53 and for reception within suitable sockets 56 and 57 respectively, formed or positioned upon the interior surfaces of the side walls 15 and 16, adjacent the top of the casing A. Each of the bars 53 is centrally provided with a crimped or bent portion 58, extending oppositely on the bars 53 from the downturned angled ends 54 and 55. The bars 53 are provided for support upon the side walls 15 and 16, adjacent the ends 48 of the container B and upwardly thereof in such manner that the pocket formed thereof by the upwardly bent portion 58 will receive suitable lugs or stop members 59 and 60 formed diametrically opposite upon the sides of the container B. In order to support the bars 53 in their proper position throughout their lengths, suitable brackets 61 are provided intermediate the angled ends of said bars, and the extreme ends of which brackets 61 are downturned substantially at right angles for reception within suitable socket members 62 rigidly or otherwise affixed upon the interior of the end walls 10 and 11 forming the casing A.

Figure 2:
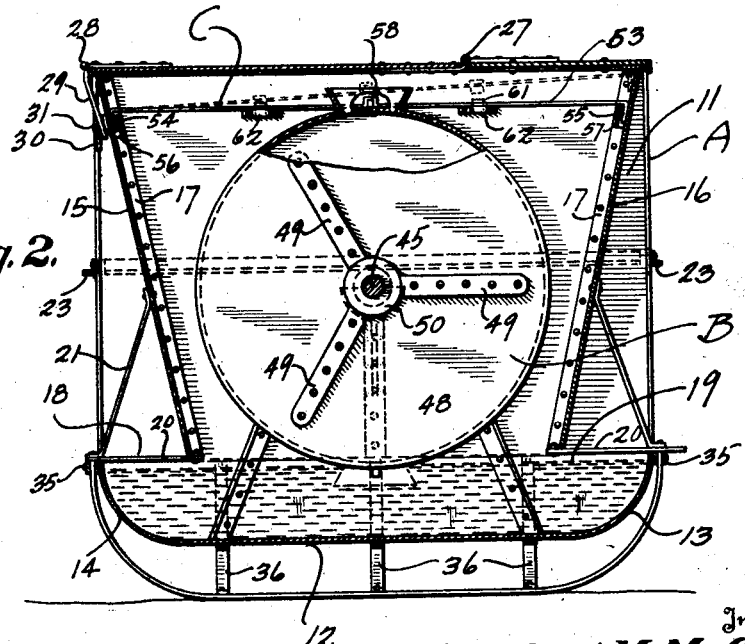
Figure 2 is a cross sectional view taken on the line 2—2 of Figure 1, and showing the device employed as a watering fountain.

In order to maintain the container B with the opening 51 therein uppermost, whereby liquids can be fed into the container B, the bars 53 are so positioned that the casing B can be rotated upon its axis designated by the shafts 45 until the lugs 59 are uppermost. The bars 53 are then placed downwardly into the sockets 54 and 57 until the clinched or bent portions 58 are positioned over the locking stops 59. In this position, the container B will be prevented from oscillating either way upon its shafts 45. The cover 26 of course having been opened, the container can be filled through its mouth opening 51, without any liability of the container B accidentally oscillating or rotating. The container B having been filled to the required quantity, the bars 53 are then swung back by means of lifting one angled end 55 of each out of its socket 57 as indicated in the dotted lines in Figure 2 of the drawings. In this position, the locking stops or lugs 59 will be released, and the container B can be oscillated upon its shafts 45, until the mouth opening 51 of the container B is disposed downmost, for permitting liquid from within the container B to flow into the trough as designated upon the bottom 12 of the casing A. The liquid will of course, continue to flow from the container B, until the height of the liquid within the trough on the bottom of the container A is above the outlet opening 51 of said container. In this position, the level of the liquid within the casing A will be substantially even with the entrances 18 and 19. In this position, atmospheric pressure upon the water in the casing A will be such as to be greater than the pressure within the container B, wherein a partial vacuum is created by outflow of water therefrom. The container B will consequently be actuated by discharge of water from the casing A. Attention is called to the fact that no valves or other filling devices are necessary in use of the container B, since the same opening therein is used for discharge purposes, as is used for filling the same. The container B is clamped in position for automatic feed of water or other liquid by means of the bars 53 engaging over the stops 60, disposed diametrically opposite the stops 59.

In connection with the use of the improved device, as a regulator for feed of dry materials, the casing A is used in substantially the same shape and arrangement as that above described for that in use with the fountain. However, the end walls 10 and 11 of the casing A are interiorly provided with the supporting strips 65, and 66, riveted or otherwise secured in rigid manner upon the interior surface of each of said end walls 10 and 11, and in converging relation from the bottom of the casing A, to points in spaced relation to the upper ends of the end walls 10 and 11. Each of the supporting strips 65 and 66 is provided with outwardly extending supporting flanges 67 and 68 respectively, downwardly diverging from the apex 69; said apex 69 forming the abutting point of said outwardly extending flanges 67 and 68, from which they diverge downwardly to the bottom 12. The inverted V-shaped guide member D is formed of sheet material, and bent in exact conformity to overlie the various supporting flanges 67 and 68. Thus, the guide member D rests upon the supporting strips 65 and 66. The grain or other material preferably in dry form is fed through the opening covered by the closure member 26 of casing A, and in such manner that said feed will flow downwardly from the apex 70 of the member D over either outer leg 71 and 72 of said members D. The dry feed will accumulate within the casing A, and upon the bottom 12 adjacent the arcuate side portions 13 and 14, as is shown in Figure 4 of the drawings. As the stock or poultry exhausts the supply of feed adjacent the feed openings 18 and 19, the pressure of the feed from within the casing A will direct certain quantities thereof downwardly adjacent the feed openings 18 and 19. Due to the connection of the detachable member D over the supporting flanges 65 and 66, the dry feed will be prevented from accumulating interiorly in the space provided within the member D.

From the foregoing, it can be seen that an improved water fountain and device for feeding dry materials has been provided, convertible to either use as occasion demands. The parts have been constructed with utmost simplicity, and the conversion of the improved apparatus to either use can be attained with a minimum amount of labor and in a relatively short time.

Various changes in the shape, size and arrangement of parts may of course be made to the form of the invention herein shown and described without departing from the spirit of the invention or the scope of the claims.

I claim:

1. A device of the character described comprising a housing having end walls, side walls and a bottom, said side walls converging downwardly and terminating in spaced relation to the lower edges of said end walls and said bottom having its opposite side portions carried upwardly between the ends walls to provide trough portions below said side walls, supporting strips secured to the inner faces of said end walls and extending upwardly from said bottom in converging relation and meeting at a point in spaced relation to the upper ends of the end walls, and an inverted V-shaped guide member positioned in said housing between said end walls and having its lateral end portions resting upon said supporting strips said guide members extending in spaced relation to the lower edges of said side walls whereby material in the housing may be directed beneath the side walls into the troughs formed by the upturned end portions of the bottom and end walls.

2. In a convertible stock fountain and feeding device, a casing including end walls, a bottom, and side walls, said side walls having their lower edges spaced above the bottom to provide feeding openings at opposite sides of the casing, bearing members carried by the inside surfaces of the end walls providing bearing recesses therein spaced above the lower edges of the side walls, and supporting pieces carried by each of the end walls on the inside surfaces thereof in substantially inverted V-shaped relation with the adjacent bearing member between the leg portions of its adjacent V-shaped supporting piece and with the apex of the V-shaped supporting piece directly above the bearing opening in the bearing member.

SANFORD M. McCURDY.